No. 690,246. Patented Dec. 31, 1901.
G. W. DIEPOLD.
CLOTHES LINE PULLER.
(Application filed Mar. 25, 1901.)
(No Model.)
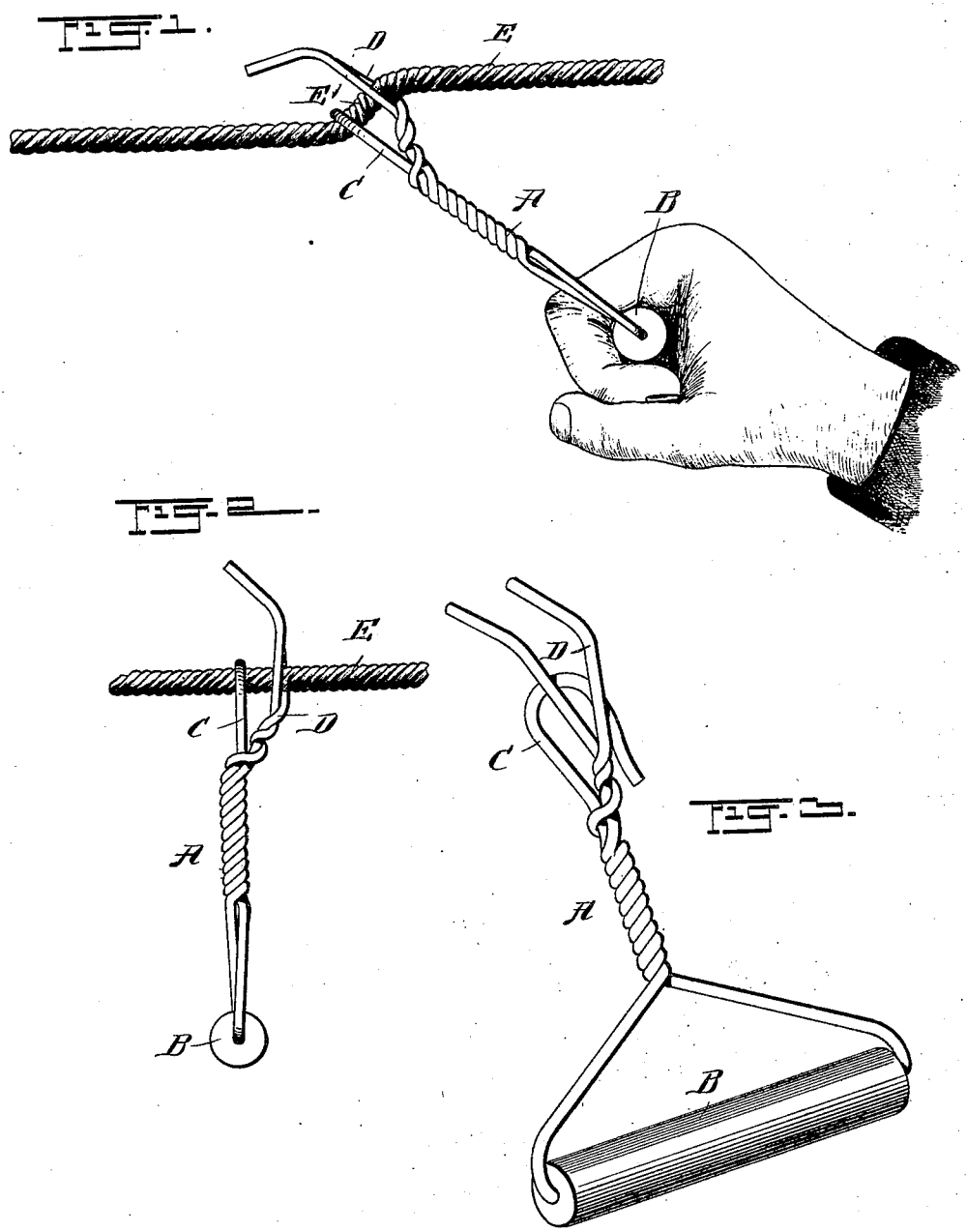
WITNESSES:
INVENTOR
George. W. Diepold.
BY
ATTORNEYS

UNITED STATES PATENT OFFICE.

GEORGE W. DIEPOLD, OF LONG ISLAND CITY, NEW YORK.

CLOTHES-LINE PULLER.

SPECIFICATION forming part of Letters Patent No. 690,246, dated December 31, 1901.

Application filed March 25, 1901. Serial No. 52,756. (No model.)

*To all whom it may concern:*

Be it known that I, GEORGE W. DIEPOLD, a citizen of the United States, and a resident of the city of New York, (Long Island City, borough of Queens,) in the county of Queens and State of New York, have invented a new and Improved Clothes-Line Puller, of which the following is a full, clear, and exact description.

The invention relates to endless clothes-lines adapted to be moved by the operator and fastened on oppositely-arranged pulleys.

The object of the invention is to provide a new and improved clothes-line puller which is simple and durable in construction, readily applied to a clothes-line, and arranged to enable a person to conveniently and quickly draw the line in or out for hanging wet clothes thereon or for removing dry clothes therefrom.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied and in position for moving the clothes-line. Fig. 2 is a like view of the improvement when released and hanging loose on the clothes-line, and Fig. 3 is a perspective view of the improvement.

The improved clothes-line puller consists, essentially, of a shank A, terminating at one end in a suitable handle B, extending transversely and adapted to be taken hold of by the operator for moving the clothes-line in or out to hang clothes on the line or to remove clothes from the same. The outer end of the shank A terminates in a transversely-extending hook C, and from the outer end of the shank A also extends a fork D, connected with the shank at an angle to the hook and having its prongs diverging in the direction of the length of the clothes-line E, adapted to be engaged by the hook C, as is plainly shown in Figs. 1 and 2.

When the hook C and the fork D engage the clothes-line, as shown in Fig. 2, then the bottom of the said fork D engages the under side of the clothes-line E, while the hook C engages the top thereof, and when the device is in this position it can be readily moved forward or backward on the clothes-line without disturbing the same. When it is desired, however, to impart movement to the clothes-line, then the operator takes hold of the handle B and swings the device into an angular position relatively to the clothes-line, as shown in Fig. 1, so that the portion of the clothes-line between the fork D and the hook C is moved into a bent position, as indicated in Fig. 1, and both the fork and the hook firmly grip the clothes-line, and upon the operator now exerting a pull the clothes-line is drawn along in the direction of the pulley. As soon as the pulley has been reached the operator swings the device into a right-angle position relatively to the clothes-line E, as shown in Fig. 2, and then slides the device forward on the clothes-line without disturbing the position thereof and then again moves the device into an angular position to take another grip on the clothes-line and draw the same a second time whenever desired.

It is understood that the operator can readily place the device on either of the runs of the clothes-line and move the line in or out in the usual manner—that is, to move the clothes out on the lower run of the clothes-line the operator takes hold of the upper run with the puller and pulls this upper run inward, and when it is desired to pull the dry clothes in then the operator applies the device on the lower run of the clothes-line and pulls on the same, as above described.

The device is very simple and durable in construction and the shank A, as well as the hook C and fork D, are preferably made of two pieces of wire twisted together, as shown, to form the shank A. The hook C is formed by one of said wires, and the fork D is formed by the ends of the other wire, which latter is bent upon itself to form the handle portion. The prongs of the fork, as shown, extend beyond the hook, the ends of the prongs of the fork being bent forward and extending over the hook to permit of conveniently applying the device on the clothes-line and to prevent accidental disengagement of the device from the line when released by the operator.

Having thus fully described my invention,

I claim as new and desire to secure by Letters Patent—

1. A clothes-line puller, comprising two pieces of wire twisted together to form a shank, a transversely-extending hook at the outer end of the shank and formed by one of said wires, a fork also extending from the outer end of the shank at an angle to the hook and formed by the ends of the other wire the diverging prongs of the fork extending beyond the hook and having the ends bent and extending over the hook, and a handle connected with the other end of the shank, as set forth.

2. A clothes-line puller, consisting of two pieces of wire twisted together to form a shank, a transversely-extending hook at the outer end of the shank and formed by one of said wires, a fork also extending from the outer end of the shank and formed by the ends of the other wire, the latter wire being bent upon itself to form a transversely-extending handle at the other end of the shank portion, as set forth.

In testimony whereof I have signed my name to this specification in the presence of two subscribing witnesses.

GEORGE W. DIEPOLD.

Witnesses:
ROBERT J. LEE,
CHAS. BRESLOFF.